United States Patent [19]

Kent

[11] 4,426,497

[45] Jan. 17, 1984

[54] POLYMER MIXTURES COMPRISING POLYETHYLENE AND 1,4 POLYBUTADIENE

[75] Inventor: Eric G. Kent, Sarnia, Canada

[73] Assignee: Polysar Limited, Sarnia, Canada

[21] Appl. No.: 359,254

[22] Filed: Mar. 18, 1982

[30] Foreign Application Priority Data

May 1, 1981 [CA] Canada .................................. 376722

[51] Int. Cl.³ ...................... C08L 23/26; C08L 23/06; C08L 9/00
[52] U.S. Cl. .................................... 525/194; 525/232; 204/159.2
[58] Field of Search .............................. 525/232, 194; 204/159.2

[56] References Cited

U.S. PATENT DOCUMENTS

| | | | |
|---|---|---|---|
| 2,832,748 | 4/1958 | Safford et al. | 260/45.5 |
| 2,834,751 | 5/1958 | Jones | 260/45.5 |
| 3,299,181 | 1/1967 | Coover et al. | 260/897 |

FOREIGN PATENT DOCUMENTS 1212724  3/1966  Fed. Rep. of Germany ...... 525/232

*Primary Examiner*—Carman J. Seccuro
*Attorney, Agent, or Firm*—Stevens, Davis, Miller & Mosher

[57] ABSTRACT

A polymeric covering material is provided which is prepared by crosslinking a mixture comprising a polyethylene and a polybutadiene. Such material may be used as a heat shrinkable film, for splice covering tubes and as a protective coating for articles.

10 Claims, No Drawings

POLYMER MIXTURES COMPRISING POLYETHYLENE AND 1,4 POLYBUTADIENE

FIELD OF THE INVENTION

This invention is directed to a new product which is a polymeric covering material which is prepared by crosslinking of a mixture comprising a polyethylene and a polybutadiene.

DESCRIPTION OF THE PRIOR ART

Polymers of ethylene are well known and may be prepared by various methods. Polyethylene may have a density within certain well known ranges and may have a melt flow ranging from quite low to very high. For certain types of polyethylene, the high strength properties make them suitable for various wrapping, packaging and coating applications when a pre-formed shape may be used in conjunction with a heat sealing procedure to seal the pre-formed shaped item containing the article to be wrapped, packaged or coated. However, a polyethylene having a combination of good ambient temperature strength, reasonable elongation without necking and acceptable high temperature strength is not available, although bi-axial orientation does allow this combination of properties to be approached.

U.S. Pat. No. 2,832,748 teaches that vulcanizable compositions contain polyethylene, a polybutadient having at least 30 percent of 1,2-structure and an organic peroxide. U.S. Pat. No. 2,834,751 discloses blends of polyethylene and a polybutadiene in which at least 50 percent of the double bonds have been hydrogenated.

SUMMARY OF THE INVENTION

It is an objective of this invention to provide a new product which is a polymeric covering material which is prepared by crosslinking of a mixture comprising a polyethylene and a polybutadiene. More specifically, it is an objective of this invention to provide a new product which is a polymeric covering material which is prepared by crosslinking by reaction with an organic peroxide or by treatment with radiation of a mixture comprising a polyethylene and a polybutadiene.

DESCRIPTION OF THE INVENTION

According to may invention, there is provided a new product which is a polymeric covering material which is prepared by crosslinking by reaction with an organic peroxide or by treatment with radiation of a mixture which contains, per 100 parts by weight of polymeric materials, from about 60 to about 95 parts by weight of a polyethylene and from about 5 to about 40 parts by weight of a polybutadiene having from about 85 to about 98 percent of 1,4-structure.

Further in accordance with my invention, there is provided a new product which is a polymeric covering material which is prepared by crosslinking by reaction with an organic peroxide or by treatment with radiation of a mixture which contains, per 100 parts by weight of polymeric materials, from about 60 to about 95 parts by weight of polyethylene having a density of from about 0.95 to about 0.965 g/cm$^3$ and from about 5 to about 40 parts by weight of a polybutadiene having from about 85 to about 98 percent of 1,4-structure.

Still further in accordance with my invention, there is provided a new product which is a polymeric covering material which is prepared by crosslinking by reaction with an organic peroxide or by treatment with radiation of a mixture which contains, per 100 parts by weight of polymeric materials, from about 60 to about 95 parts by weight of polyethylene having a density of from about 0.915 to about 0.935 g/cm$^3$ and from about 5 to about 40 parts by weight of a polybutadiene having from about 85 to about 98 percent of 1,4-structure.

Polyethylene is a well known material and is readily available, as a commercial product, having a density of from about 0.915 to about 0.935 g/cm$^3$ as the well known low density polymer and having a density of from about 0.95 to about 0.965 g/cm$^3$ as the well known high density polymer. The density of polyethylene may be determined by either of ASTM D 792 or ASTM D 1505. Generally, I prefer to use the ASTM D 1505 procedure.

Polybutadiene having from about 85 to about 98 percent of 1,4-structure is well known in the industry. Polybutadiene may contain its carbon-carbon double bonds in the cis-1,4, the trans-1,4 or the 1,2-structure. By 1,4-structure, I mean the total of the cis-1,4 and the trans-1,4 structures. Such polybutadiene may be prepared by the polymerization of butadiene in the presence of a suitable catalyst such as an alkyl lithium compound (e.g. butyl lithium), or a titanium compound-aluminum alkyl (e.g. titanium tetraiodide-triethyl aluminum), or a cobalt compound-aluminum alkyl compound (e.g. cobalt octoate-diethyl aluminum chloride), or a nickel compound-boron trifluoride compound-aluminum alkyl (e.g. nickel octoate-boron trifluoride etherate-triethyl aluminum). Polybutadiene prepared with an alkyl lithium compound generally has a 1,4-content of about 85 to about 90 percent with about 30–35 percent of cis-1,4 and about 55–58 percent of trans-1,4 structure. Polybutadienes prepared with the other catalysts described above generally have a 1,4-content of from about 90 to about 98 percent, the cis-1,4 content generally being from about 90 to about 97 percent and the balance being trans-1,4. Such polybutadienes are solid high molecular weight materials having Mooney values (ML 1+4 @ 100° C.) of from about 30 to about 80.

The crosslinking of the mixture of polymers may be achieved by heating in the presence of an organic peroxide or by exposure to radiation. Radiation crosslinking is generally achieved by the use of an electron beam, with the intensity of the beam and the time of exposure to the beam being controlled such as to cause the crosslinking to predominate rather than degradation to predominate. Organic peroxides such as benzoyl peroxide, lauryl peroxide or dicumyl peroxide are well known as peroxidic crosslinking agents and are the most preferred compounds. The organic peroxide is mixed with the polymeric mixture in amounts of from about 1 to about 5 parts by weight per 100 parts by weight of polymeric materials. The crosslinking reaction is initiated by heating the peroxide containing polymeric mixture at temperatures of from about 125° to about 175° C. for times of from about 2 to about 60 minutes.

The polyethylene and the polybutadiene are mixed together at a temperature above the melting point of the polyethylene, the mixing being on a rubber mill or in an internal mixer. The mill or mixer is pre-heated to a temperature of about 110° to about 145° C., the polyethylene is then fed to it and fluxed until a uniform melt is produced, and then the polybutadiene is added and the mixing continued until a uniform polymeric mixture is produced. When an organic peroxide is to be added, the temperature of the polymeric mixture is reduced to below about 150° C., preferably below about 140° C., and the peroxide added and mixed in as quickly as possible so as to avoid premature curing during the mixing step. The mixture is removed, cooled and may be formed into sheets or pellets.

The amount of polybutadiene that I add is, based on 100 parts by weight of polymeric materials, from about 5 to about 40 parts by weight. Preferably, I add from about 10 to about 25 parts by weight of polybutadiene per 100 parts by weight of polymeric materials.

The compositions of my invention may be used as polymeric covering materials by which I include heat shrinkable film and tape, container bags such as bags for holding foods and which can be boiled without removal from the bag, splice covering tubes as for covering electrical wire cable connections, pipe coating, protective coating of finished or semi-finished articles for storage purposes and similar such uses where good environmental stress cracking resistance is required in combination with good stress-strain properties and good high temperature strength properties.

The following examples illustrate my invention and are not intended to limit the scope therefore. In the examples, all parts are parts by weight unless specified and the test procedures used are all standard ASTM test methods.

EXAMPLE 1

A high density polyethylene having a density of 0.96 and a melt flow of 0.8 g/10 minutes was added to a two roll rubber mill which had been preheated to a temperature of 128°–130° C., melted and fluxed for 1 to 2 minutes, the polybutadiene was added and the mixing continued for a further 1 to 2 minutes, the mill roll temperature was adjusted, if necessary, to about 125°–127° C. and the curvative (98% pure dicumyl peroxide) was added and mixing was continued for a further 1 to 2 minutes. The polymeric mixture was taken off the mill in a sheet, allowed to cool and then broken in small pieces. Sheets of the polymeric mixture were prepared by compression molding at 170° C. for the time necessary for curing, dumbbells were cut out of the sheets and the stress-strain properties were determined. The composition of the polymeric materials is shown in Table I. The polyethylene used was as described above and is identified in Table I as Polymer 1. One sample of polybutadiene identified as Polymer 2 was a high cis-1,4 polybutadiene sold by Polysar Limited as TAKTENE® 1220. The other sample of polybutadiene identified as Polymer 3 was a high 1,4-polybutadiene sold by Firestone as DIENE® 55. In Table I, Experiments 1, 2, 3 and 4 are controls. The results in Table I show that the polymeric mixtures according to the invention possess good strength properties at room temperature and acceptable strength properties at 137° C. A film sample of the product of Experiment 7 was, on heating, readily stretched to about 50% elongation and on cooling retained its stretched shape. Reheating of the stretched film caused it to return to essentially its original size. A sheet of film was heated, stretched to about 50% elongation, cooled, then wrapped around a shaped article and on reheating shrank onto and covered the article, showing the suitability of the material for use as a heat shrink film.

TABLE I

| Expt. No. | Polymer | Curative | Cure Time | at R.T. T | M | E | at 137° C. T | M | E |
|---|---|---|---|---|---|---|---|---|---|
| 1 | 100 Polymer 1 | 0 | 15 | 520$^x$ | 168$^x$ | 900$^x$ | 1$^{xx}$ | — | 7500$^{xx}$ |
| 2 | 100 Polymer 1 | 2 | 15 | 200 | 181 | 145 | 21$^{xx}$ | 15$^{xx}$ | 225$^{xx}$ |
| 3 | 100 Polymer 1 | 2 | 30 | 202 | 167 | 500 | 3$^{xx}$ | 3$^{xx}$ | 290$^{xx}$ |
| 4 | 90 Polymer 1<br>10 Polymer 2 | 0 | 15 | 298 | 133 | 875 | 1$^{xx}$ | 1$^{xx}$ | 180$^{xx}$ |
| 5 | 90 Polymer 1<br>10 Polymer 2 | 1 | 15 | 305 | 187 | 475 | 17 | 16 | 125 |
| 6 | 90 Polymer 1<br>10 Polymer 2 | 2 | 30 | 265 | 185 | 340 | 22 | 15 | 190 |
| 7 | 80 Polymer 1<br>20 Polymer 2 | 2 | 15 | 266 | 250 | 180 | 27 | — | 60 |
| 8 | 60 Polymer 1<br>40 Polymer 3 | 1 | 15 | 220 | 176 | 160 | 42 | 38 | 120 |

NOTE:
T = Tensile strength at break, kg/cm$^2$
M = Modulus at 100% elongation, kg/cm2
E = Elongation at break, %
R.T. = Room Temperature
Cure temperature is 170° C., cure time = minutes
$^x$ = samples started to neck after 20 to 40% elongation
$^{xx}$ = samples were partially molten and were acting as a molten strand

EXAMPLE 2

A low density polyethylene, identified in Table II as Polymer 4, having a density of 0.923 and a melt flow of 2 g/10 minutes and the polybutadiene identified as Polymer 2 in Example 1 were used to prepare the polymeric mixtures shown in Table II. The procedure used was essentially the same as that in Example 1 except that the mixing temperature was about 110° C. Experiment 9 is a control. Experiments 10, 11 and 12 exhibit good strength properties at room temperature and acceptable strength properties at 137° C.

TABLE II

| Expt. No. | Polymer | Curative | Cure Time | at R.T. T | M | E | at 137° C. T | M | E |
|---|---|---|---|---|---|---|---|---|---|
| 9 | 90 Polymer 4<br>10 Polymer 2 | 0 | 15 | 116 | 74 | 515 | 1$^{xx}$ | 1$^{xx}$ | 230$^{xx}$ |
| 10 | 90 Polymer 4<br>10 Polymer 2 | 2 | 15 | 181 | 107 | 315 | 12 | 10 | 150 |
| 11 | 80 Polymer 4 | 2 | 15 | 178 | 128 | 190 | 12 | — | 80 |

TABLE II-continued

| Expt. No. | Polymer | Curative | Cure Time | at R.T. T | M | E | at 137° C. T | M | E |
|---|---|---|---|---|---|---|---|---|---|
| 12 | 20 Polymer 2<br>60 Polymer 4<br>40 Polymer 2 | 2 | 15 | 131 | 131 | 100 | 22 | — | 45 |

NOTE:
T = Tensile strength at break, kg/cm$^2$
M = Modulus at 100% elongation, kg/cm2
E = Elongation at break, %
R.T. = Room Temperature
Cure temperature is 170° C., cure time = minutes
xx = samples were partially molten and were acting as a molten strand

What is claimed is:

1. A polymeric covering material which is prepared by crosslinking by reaction with an organic peroxide at a temperature of from about 125° to about 175° C. or by treatment with radiation and which contains per 100 parts by weight of polymeric materials from about 60 to about 95 parts by weight of a polyethylene and from about 5 to about 40 parts by weight of a polybutadiene having from about 90 to about 97 percent of cis-1,4 structure.

2. The polymeric material of claim 1 wherein the polyethylene has a density of from about 0.95 to about 0.965 g/cm$^3$.

3. The polymeric material of claim 1 wherein the polyethylene has a density of from about 0.915 to about 0.935 g/cm$^3$.

4. The polymeric material of claim 1 wherein the polyethylene has a density of from about 0.95 to about 0.965 g/cm$^3$ and the crosslinking is by reaction with an organic peroxide selected from benzoyl peroxide, lauryl peroxide and dicumyl peroxide.

5. The polymeric material of claim 1 wherein the polyethylene has a density of from about 0.95 to about 0.965 g/cm$^3$ and the crosslinking is by reaction with an organic peroxide selected from benzoyl peroxide, lauryl peroxide and dicumyl peroxide.

6. The polymeric material of claim 4 wherein the polyethylene has a density of from about 0.915 to about 0.935 g/cm$^3$ and the crosslinking is by reaction with an organic peroxide selected from benzoyl peroxide, lauryl peroxide and dicumyl peroxide.

7. The polymeric material of claim 1 wherein the polyethylene has a density of from about 0.915 to about 0.935 g/cm$^3$ and the crosslinking is by reaction with an organic peroxide selected from benzoyl peroxide, lauryl peroxide and dicumyl peroxide.

8. The polymeric material of claim 1 wherein the crosslinking is by reaction with an organic peroxide present in an amount of from about 1 to about 5 parts by weight per 100 parts by weight of polymeric materials and the crosslinking is achieved by heating at a temperature of from about 125° C. to about 175° C. for from about 2 to about 60 minutes.

9. A polymeric covering material which is prepared by crosslinking by reaction with an organic peroxide at a temperature of from about 125° to about 175° C. or by treatment with radiation and which contains per 100 parts by weight of polymeric materials from about 60 to about 95 parts by weight of a polyethylene and from about 5 to about 40 parts by weight of a polybutadiene having from about 85 to about 90 percent of 1,4 structure.

10. The polymeric material of claim 9 wherein the crosslinking is by reaction with an organic peroxide present in an amount of from about 1 to about 5 parts by weight per 100 parts by weight of polymeric materials and the crosslinking is achieved by heating at a temperature of from about 125° to about 175° C. for from about 2 to about 60 minutes.

* * * * *